United States Patent [19]
Robbins

[11] Patent Number: 5,808,862
[45] Date of Patent: Sep. 15, 1998

[54] COMPUTER CONFIGURATION WHICH ALLOWS CONVERSION BETWEEN MULTIPLE OPERATIVE POSITIONS

[75] Inventor: Daniel C. Robbins, Easley, S.C.

[73] Assignee: NCR Corporation, Dayton, Ohio

[21] Appl. No.: 220,406

[22] Filed: Mar. 30, 1994

Related U.S. Application Data

[63] Continuation of Ser. No. 994,856, Dec. 22, 1992, abandoned.

[51] Int. Cl.$^6$ .................................................. G06F 1/16
[52] U.S. Cl. ............................................................. 361/681
[58] Field of Search ........................... 364/708.1, 709.11; 312/223.2; 345/169, 905; 206/305, 320, 576; 248/917–923; 235/1 D, 145 R, 146; 361/679–687, 724–727, 752, 755, 796, 826, 827

[56] References Cited

U.S. PATENT DOCUMENTS

| | | | |
|---|---|---|---|
| 5,002,184 | 3/1991 | Lloyd | 206/305 |
| 5,128,829 | 7/1992 | Loew | 361/683 |

FOREIGN PATENT DOCUMENTS

| | | | |
|---|---|---|---|
| 454120 | 10/1991 | European Pat. Off. | G06F 1/16 |
| 4-188208 | 7/1992 | Japan | G06F 1/16 |

*Primary Examiner*—Michael W. Phillips
*Attorney, Agent, or Firm*—Paul J. Maginot

[57] ABSTRACT

A convertible computer includes a base portion having an operative side and a rear side. The computer further includes a display portion, pivotally attached to the base portion, having an operative side and a rear side, the rear side of the display portion being positionable substantially adjacent the rear side of the base portion. Moreover, the computer includes a cover positionable over the operative side of the base portion.

10 Claims, 2 Drawing Sheets

COMPUTER CONFIGURATION WHICH ALLOWS CONVERSION BETWEEN MULTIPLE OPERATIVE POSITIONS

This is a continuation of application Ser. No. 07/994,856 filed on Dec. 22, 1992, now abandoned.

CROSS REFERENCE

Cross reference is made to U.S. patent application Ser. No. 07/973,507 (Attorney Docket No. 5543), filed Nov. 9, 1992 and entitled "Flip Screen for Notebook Computers," which is assigned to the same assignee as the present invention, now U.S. Pat. No. 5,276,589.

BACKGROUND OF THE INVENTION

The present invention relates generally to computer configurations and, more particularly, to computer configurations which allow conversion between multiple operative positions.

There exist numerous configurations of computers such as the configuration of a notebook computer which typically has a clamshell-like appearance and includes a keyboard portion which usually houses the bulk of the operating devices of the computer, and a display portion which is pivotally attached or hinged to the keyboard portion. Another configuration of a computer is a pen-based or stylus-input computer which has a panel-shaped appearance and includes a screen positioned on the upper portion thereof. The screen includes a display (e.g. a liquid crystal display) combined with a digitizer input device. Since the screen is positioned on the upper portion of the panel-shaped computer, a user can conveniently provide input to the computer by writing on the surface of the screen with a pen or stylus.

Both notebook computers and pen-based computers are becoming popular and users may desire to incorporate some of the features of each of the above computers into a single computer. In other words, it may be desirable to provide a single computer which includes both a keyboard input device and a digitizer input device. However, simply combining a digitizer input device with the display of a notebook computer would not provide the user with an ergonomic configuration. It would, therefore, be desirable to provide an ergonomic configuration to a computer which includes a keyboard input device and a digitizer input device. Moreover, it would be desirable if such computer configuration would be simple for a user to operate.

SUMMARY OF THE INVENTION

In accordance with one embodiment of the present invention, there is provided a convertible computer which includes a base portion having an operative side and a rear side. The computer further includes a display portion, pivotally attached to the base portion, having an operative side and a rear side, the rear side of the display portion being positionable substantially adjacent the rear side of the base portion.

Pursuant to another embodiment of the present invention, there is provided a convertible computer which includes a base portion having a first end and a second end opposite the first end, the base portion further having an operative side and a rear side. The convertible computer further includes a display portion pivotally attached to the first end of the base portion, the display portion having an operative side and a rear side. Moreover, the convertible computer includes a cover pivotally attached to the second end of the base portion.

In accordance with yet another embodiment of the present invention, there is provided a convertible computer having a first panel with a display and input sensor, and a second panel with an input device. The first panel and the second panel of the convertible computer are flexibly connected one to the other so that the display of the first panel and the input device of the second panel face away from each other in a first mode of operation and can both be viewed by a user in a second mode of operation.

It is therefore an object of the present invention to provide a new and useful configuration of a computer.

It is another object of the present invention to provide an improved configuration of a computer.

It is yet another object of the present invention to provide an ergonomic configuration of a computer.

It is still another object of the present invention to provide a computer configuration which is simple for a user to operate.

It is yet another object of the present invention to provide a computer configuration which is readily and conveniently convertible from one mode of operation to another mode of operation.

It is moreover another object of the present invention to provide a computer configuration which is readily and conveniently convertible from a notebook computer to a pen-based computer.

The above and other objects, features, and advantages of the present invention will become apparent from the following description and the attached drawings.

DETAILED DESCRIPTION OF THE PREFERRED EMBODIMENT

Figure 1:
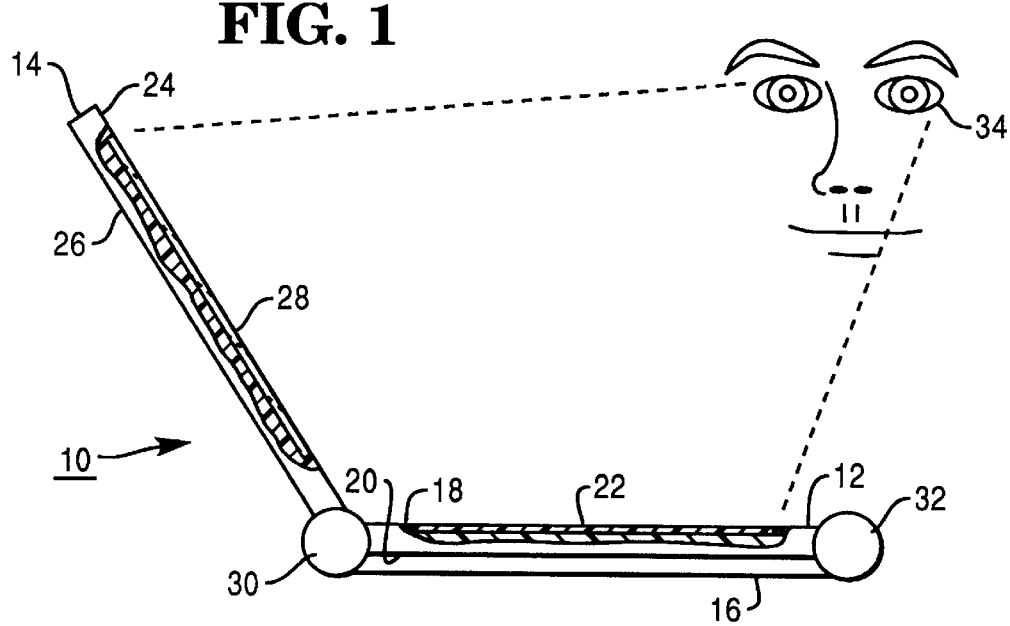
FIG. 1 is a side elevational view of a convertible computer incorporating the features of the present invention therein with the convertible computer being shown positioned in a first mode of operation.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is cover all modifications, equivalents, and alternatives falling within the spirit and scope of the invention as defined by the appended claims.

In FIG. 1 of the drawings, there is shown a computer, generally indicated by the reference numeral 10. Computer 10 includes a base portion 12, a display portion 14 and a cover 16. The base portion 12 has an operative side 18 and a rear side 20 (see also FIG. 3). Positioned on the operative side 18 of the base portion 12 is a first input device 22. The first input device 22 is a keyboard. The display portion 14 has an operative side 24 and a rear side 26. Positioned on the operative side 24 of the display portion 14 is a screen 28 which includes a display and second input device. The display and second input device is a liquid crystal display combined with a digitizer input device. The display portion 14 is pivotally attached to the base portion 12 at one end thereof via a first coupler shaft 30. Similarly, the cover 16 is pivotally attached to another end of the base portion 12 via a second coupler shaft 32.

Figure 2:
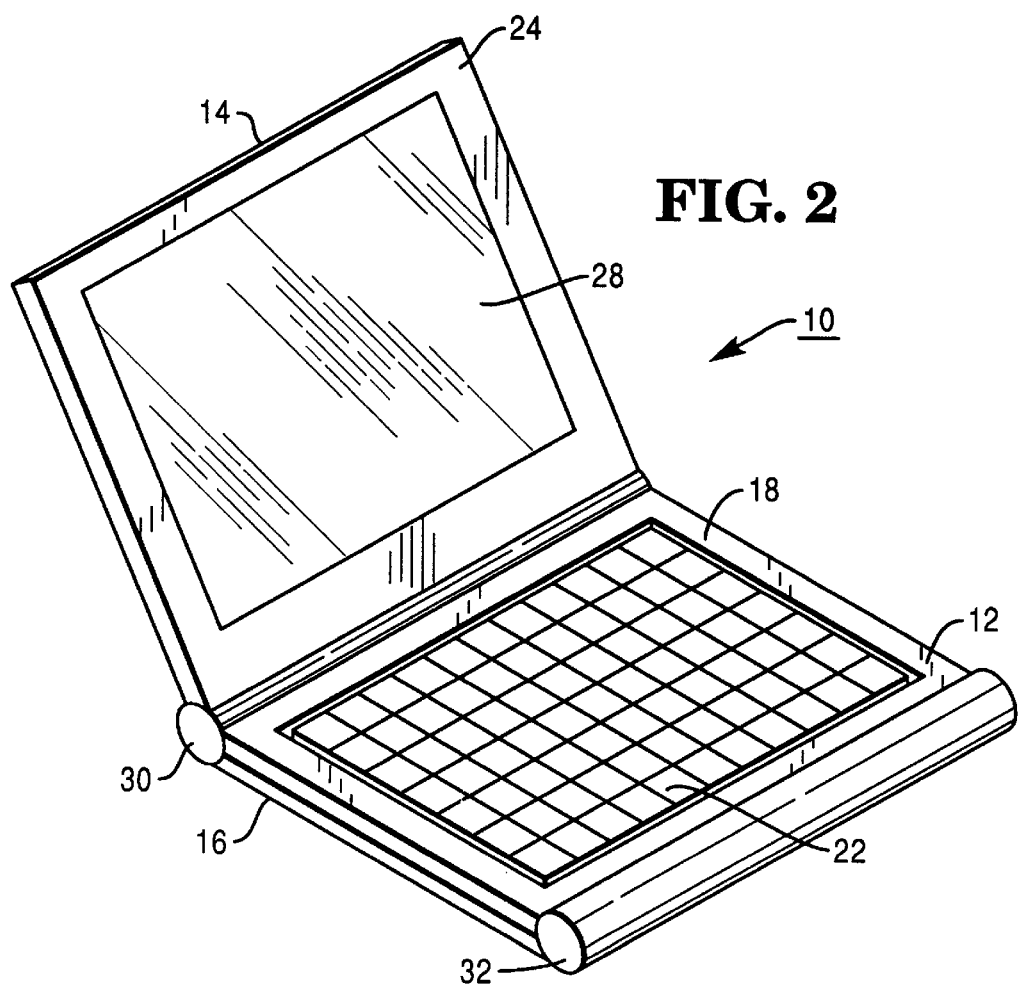
FIG. 2 is a perspective view of the convertible computer of FIG. 1 with the convertible computer shown positioned in the first mode of operation.

In FIGS. 1 and 2, the computer 10 is shown positioned in a first mode of operation. In the first mode of operation, the base portion 12 and the display portion 14 are oriented, relative to each other, so that the first input device 22 and the screen 28 are both within the normal viewing range of a user of the computer, schematically illustrated by an eye 34. Moreover, in the first mode of operation, the cover 16 is conveniently stowed at a position substantially adjacent the rear side 20 of the base portion 12. Further, in the first mode of operation, the user may comfortably provide input to the computer 10 via the first input device 22 and view output of the computer via the screen 28.

Figure 3:
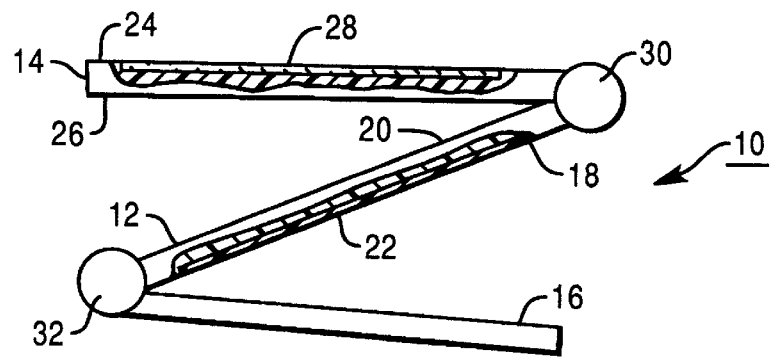
FIG. 3 is a side elevational view of the convertible computer of FIG. 1 with the convertible computer shown at a position during its conversion between the first mode of operation and a second mode of operation.
Figure 4:
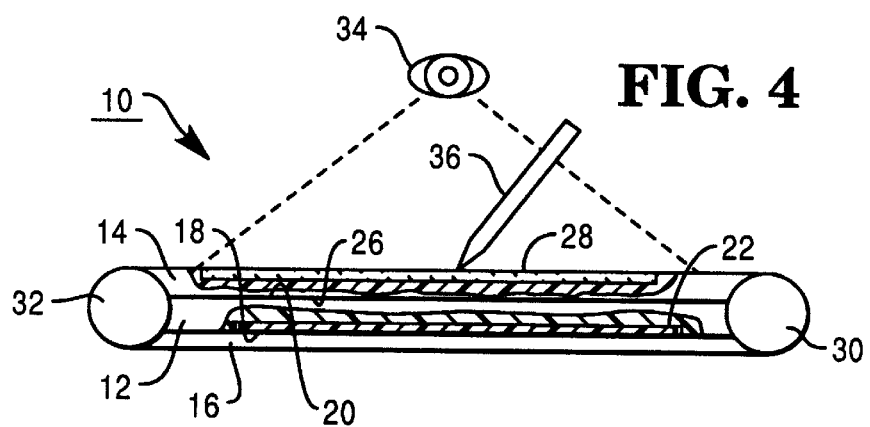
FIG. 4 is a side elevation view of the convertible computer of FIG. 1 with the convertible computer shown positioned in the second mode of operation.
Figure 5:
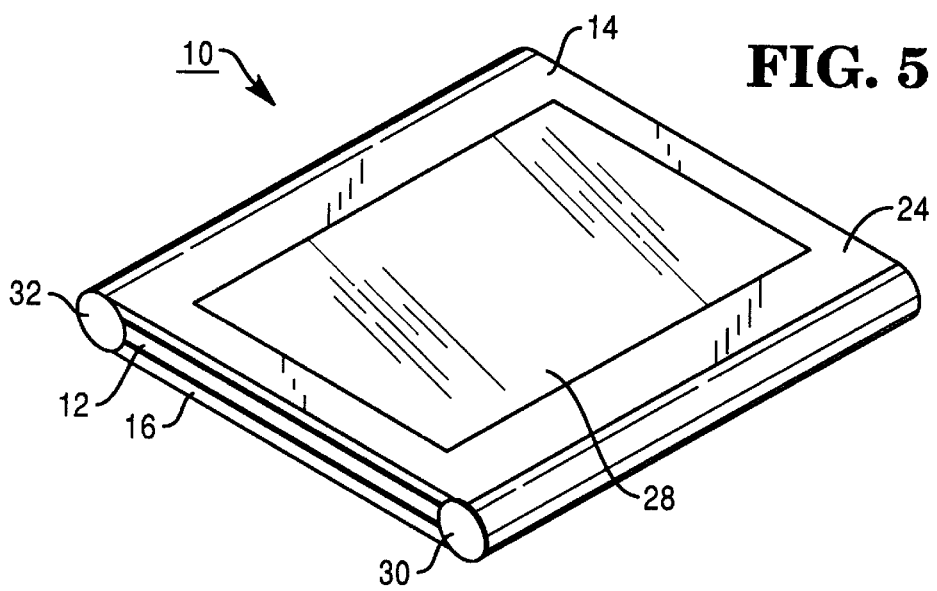
FIG. 5 is a perspective view of the convertible computer of FIG. 1 with the convertible computer shown positioned in the second mode of operation.

The computer 10 is also positionable in a second mode of operation as shown in FIGS. 4 and 5. FIG. 3 shows the computer 10 at a position during conversion of the computer 10 between its two modes of operation. In the second mode of operation, the base portion 12 and the display portion 14 are oriented, relative to each other, so that the screen 28 is within the normal viewing range of the user 34. However, since the screen 28 includes a second input device, as discussed above, and the various parts of the computer 10 form a compact assembly, the user may conveniently provide input to the computer 10 in the same manner as input is provided to a conventional paper notepad. More specifically, the user may readily position the computer 10 at any convenient and desirable writing orientation so as to provide input to the screen 28 of the computer 10 with a pen or stylus 36. In the second mode of operation, the rear side 26 of the display portion 14 is positioned substantially adjacent the rear side 20 of the base portion 12. Moreover, in the second mode of operation, the cover 16 is positioned over the operative side 18 of the base portion 12 so as to conveniently and effectively shield the first input device 22.

It should be noted that the cover 16 may be pivoted, relative to the base portion 12, from its position as shown in FIG. 1 (computer 10 in first mode of operation) where it is located substantially adjacent the rear side 20 of the base portion 12 to its position as shown in FIG. 4 (computer 10 in second mode of operation) where it is located substantially adjacent the operative side 18 of the base portion 12. In addition, the display portion 14 may be pivoted, relative to the base portion 12, from its position as shown in FIG. 1 (computer 10 in first mode of operation) to its position as shown in FIG. 4 (computer 10 in second mode of operation) where its rear side 26 is located substantially adjacent the rear side 20 of the base portion 12.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A convertible computer, comprising:

a base portion having a keyboard side and a rear side;

a display portion, pivotally attached to said base portion, having a display and input assembly side and a rear side; and a cover pivotally attached to said base portion, wherein said cover is positionable at a first position over the keyboard side of said base portion when the rear side of said display portion is positioned substantially adjacent the rear side of said base portion, and at a second position substantially adjacent the rear side of said base portion when both the keyboard side of the base portion and the display and input assembly side of said display portion can simultaneously be viewed by a user.

2. The convertible computer of claim 1, wherein said cover pivots between the first position and the second position.

3. The convertible computer of claim 2, wherein said said cover is attached to a first end of said base portion and said display portion is attached to a second end of said base portion.

4. The convertible computer of claim 3, wherein said cover extends from the first end of said base portion to the second end of said base portion.

5. A convertible computer, comprising:

a base portion having a first end and a second end opposite the first end, said base portion further having a keyboard side and a rear side;

a display portion pivotally attached to the first end of said base portion, said display portion having a display and input assembly side and a rear side; and a cover pivotally attached to the second end of said base portion, wherein said cover is positionable at a first position over the keyboard side of said base portion when the rear side of said display portion is positioned substantially adjacent the rear side of said base portion, and at a second position substantially adjacent the rear side of said base portion when both the keyboard side of the base portion and the display and input side of said display portion can simultaneously be view by a user.

6. The convertible computer of claim 5, wherein said cover extends from the first end of said base portion to the second end of said base portion.

7. The convertible computer of claim 5, wherein said cover pivots between the first position and the second position.

8. A convertible computer, comprising:

a first panel with a display and input sensor, said first panel having a rear side;

a second panel with an input device, said second panel having a rear side; and a cover flexibly connected to said second panel, wherein said cover is positionable at a first position over said input device of said second panel when the rear side of the first panel is positioned substantially adjacent the rear side of said second panel, and at a second position substantially adjacent the rear side of said second panel when both the input device of the second panel and the display and input sensor of said first panel can simultaneously be view by a user.

9. The convertible computer of claim 8, wherein said cover is flexibly connected to a first end of said second panel, and said first panel is flexibly connected to a second end of said second panel.

10. The convertible computer of claim 9, wherein said cover extends from the first end of said second panel to the second end of said second panel.

* * * * *